(12) United States Patent
Harwood et al.

(10) Patent No.: US 7,351,909 B1
(45) Date of Patent: Apr. 1, 2008

(54) MULTILAYERED HOUSING FOR ELECTRONICS ENCLOSURES

(75) Inventors: Walter T. Harwood, Streamwood, IL (US); Glen E. Ledbury, Quincy, IL (US); G. Bruce Dilling, Elgin, IL (US); Joseph T. Charles, Arlington Heights, IL (US); John Fearncombe, Lake Barrington, IL (US)

(73) Assignee: Charles Industries, Ltd., Rolling Meadows, IL (US)

( * ) Notice: Subject to any disclaimer, the term of this patent is extended or adjusted under 35 U.S.C. 154(b) by 0 days.

(21) Appl. No.: 11/149,639

(22) Filed: Jun. 10, 2005

Related U.S. Application Data

(60) Provisional application No. 60/578,654, filed on Jun. 10, 2004.

(51) Int. Cl.
*H02G 3/08* (2006.01)
(52) U.S. Cl. ............... 174/50; 174/60; 174/37; 174/39; 220/3.8
(58) Field of Classification Search ............ 174/50, 174/59, 60, 66, 52.1, 17 VA, 520, 37, 39, 174/57, 58, 17 R, 53; 220/3.2, 3.3, 3.94, 220/3.8, 4.02; 248/906; 361/664, 600, 602, 361/641
See application file for complete search history.

(56) References Cited

U.S. PATENT DOCUMENTS

| | | |
|---|---|---|
| 2,858,179 A | 10/1958 | Puerner et al. |
| 2,966,377 A | 12/1960 | Tarle |
| 3,480,721 A | 11/1969 | Baumgartner |
| 3,513,248 A | 5/1970 | Bright et al. |
| 3,538,236 A | 11/1970 | Baumgartner |
| 3,652,779 A * | 3/1972 | Grinols ............ 174/51 |
| 3,660,613 A | 5/1972 | Mullin et al. |
| 3,714,369 A | 1/1973 | Bunten |
| 3,740,452 A * | 6/1973 | Bunten ............ 174/38 |
| RE27,898 E | 1/1974 | Baumgartner |
| 3,864,510 A | 2/1975 | Ramsey et al. |
| 3,868,040 A | 2/1975 | Langmack, Jr. et al. |
| 3,872,234 A | 3/1975 | Smith |
| 4,003,610 A | 1/1977 | Main |
| 4,058,670 A | 11/1977 | Leschinger |
| 4,097,683 A | 6/1978 | Summers |
| 4,156,998 A * | 6/1979 | McClure ............ 174/50 |
| 4,158,102 A | 6/1979 | Bright |
| 4,327,530 A | 5/1982 | Bush |
| 4,365,108 A | 12/1982 | Bright |
| 4,585,141 A | 4/1986 | Marks |
| 4,631,353 A | 12/1986 | Marks |

(Continued)

OTHER PUBLICATIONS

Channell: Signature Pedestal Housing (SPH™) Series brochure.

(Continued)

*Primary Examiner*—Angel R. Estrada
(74) *Attorney, Agent, or Firm*—Leydig, Voit & Mayer, Ltd.

(57) ABSTRACT

An outdoor pedestal enclosure for housing telecommunications equipment is provided. The outdoor pedestal enclosure includes a base section and a cover engageable with the base section so as to define an interior space. The base section and cover are made of a multilayered plastic material including an outer layer and an inner layer.

9 Claims, 3 Drawing Sheets

U.S. PATENT DOCUMENTS

| | | | |
|---|---|---|---|
| 4,644,095 | A | 2/1987 | Bright et al. |
| 4,892,978 | A * | 1/1990 | Axworthy .................. 174/38 |
| 4,901,202 | A | 2/1990 | Leschinger |
| 4,938,688 | A | 7/1990 | Wexler |
| 5,097,529 | A | 3/1992 | Cobb et al. |
| 5,127,082 | A | 6/1992 | Below et al. |
| 5,133,038 | A | 7/1992 | Zipper |
| 5,384,427 | A | 1/1995 | Volk et al. |
| 5,401,902 | A | 3/1995 | Middlebrook et al. |
| 5,430,248 | A * | 7/1995 | Levy ......................... 174/50 |
| 5,734,776 | A | 3/1998 | Puetz |
| 5,764,844 | A | 6/1998 | Mendes |
| 5,774,618 | A | 6/1998 | Jones |
| 5,860,715 | A | 1/1999 | Lohde et al. |
| 5,956,449 | A | 9/1999 | Otani et al. |
| 6,008,452 | A | 12/1999 | Lux, Jr. |
| 6,014,490 | A | 1/2000 | Canning et al. |
| 6,031,180 | A | 2/2000 | Schilling et al. |
| D430,849 | S | 9/2000 | Leschinger et al. |
| 6,167,183 | A | 12/2000 | Swain |
| D436,101 | S | 1/2001 | McGovern et al. |
| 6,182,846 | B1 | 2/2001 | Leschinger et al. |
| 6,198,041 | B1 | 3/2001 | Leschinger et al. |
| 6,226,436 | B1 | 5/2001 | Daoud et al. |
| 6,244,635 | B1 | 6/2001 | Leschinger et al. |
| 6,252,166 | B1 | 6/2001 | Leschinger |
| 6,253,016 | B1 | 6/2001 | Daoud |
| 6,275,641 | B1 | 8/2001 | Daoud |
| 6,292,614 | B1 | 9/2001 | Smith et al. |
| 6,362,419 | B1 | 3/2002 | Gallagher et al. |
| 6,411,767 | B1 | 6/2002 | Burrous et al. |
| 6,434,313 | B1 | 8/2002 | Clapp, Jr. et al. |
| 6,455,772 | B1 | 9/2002 | Leschinger et al. |
| 6,462,269 | B1 | 10/2002 | Leschinger et al. |
| 6,493,501 | B2 | 12/2002 | Flores et al. |
| 6,496,640 | B1 | 12/2002 | Harvey et al. |
| 6,501,015 | B2 * | 12/2002 | Maloney et al. ........ 174/17 VA |
| 6,539,160 | B2 | 3/2003 | Battey et al. |
| 6,542,688 | B1 | 4/2003 | Battey et al. |
| 6,598,949 | B2 | 7/2003 | Frazier et al. |
| 6,678,457 | B2 | 1/2004 | Kim et al. |
| 6,752,362 | B1 | 6/2004 | Gretz |
| 6,778,752 | B2 | 8/2004 | Laporte et al. |
| 6,901,200 | B2 | 5/2005 | Schray |
| 6,916,985 | B1 | 7/2005 | Harwood |
| 7,038,127 | B2 * | 5/2006 | Harwood .................. 174/50 |
| 7,193,151 | B2 * | 3/2007 | Harwood .................. 174/50 |
| 2002/0096346 | A1 | 7/2002 | Maloney et al. |
| 2005/0189133 | A1 | 9/2005 | Harwood |

OTHER PUBLICATIONS

Channell: Challenger Pedestal Housing (CPH™) Series brochure.
Marconi Communications Inc.: UPC Series Multi-Pupose Closures brochure, Jul. 2000.
Marconi Communications Inc.: UPC Series Cross Connect Housings brochure, Jul. 2000.
Marconi Communications Inc.: UPC1000LOC & UPC1248LOC Lift-Off Covers brochure, Jul. 2000.
Marconi Communications Inc.: UPCBDS Seriers Mult-Purpose Closures, Jul. 2000.
Marconi Network Components: ProFORM® Series Non-Metallic Pedestals product specification, Sep. 2003.

* cited by examiner

MULTILAYERED HOUSING FOR ELECTRONICS ENCLOSURES

CROSS-REFERENCE TO RELATED APPLICATIONS

This patent application claims the benefit of U.S. Provisional Patent Application No. 60/578,654 filed Jun. 10, 2004.

FIELD OF THE INVENTION

This invention pertains to electronics enclosures and, more particularly, to an improved housing for electronics enclosures.

BACKGROUND OF THE INVENTION

Outdoor electronics enclosures are used in connection with a variety of different utility applications including telephone, cable television, fiber optics and power distribution. For example, pedestal style electronics enclosures are used in telecommunications systems to house splices or terminal connections between service or distribution wires and buried telephone cables. Since pedestal enclosures are located outdoors, they must be substantially weather tight in order to protect the electronic connections from adverse environmental conditions such as wind, rain, snow and flooding. The enclosures also have to be relatively secure in order to guard against entry by unauthorized personnel and durable in order to withstand the wear-and-tear associated with being located in an outdoor environment.

To this end, in the telecommunications industry, there are a series of stringent standards with which the external housing of an electronics enclosure must comply. For example, the external housing must be able to withstand the ultraviolet (UV) radiation associated with prolonged exposure to sunlight without degrading. Additionally, the housing must be able to withstand substantial impacts even at low temperatures. The housing also must be fire resistant. Obviously, the materials of construction are an important consideration in designing an enclosure that can meet all of these requirements. Plastic housings are commonly used. However, because they must be specifically formulated to withstand harsh environmental conditions while maintaining strength and flexibility, the plastic materials used for electronics enclosure housings, particularly for the telecommunications industry, are quite expensive. Accordingly, a need exists for a more cost effective housing for electronics enclosures.

BRIEF SUMMARY OF THE INVENTION

The invention provides an outdoor pedestal enclosure for housing telecommunications equipment. The outdoor pedestal enclosure includes a base section and a cover engageable with the base section so as to define an interior space. The base section and cover are made of a multilayered plastic material including an outer layer and an inner layer. The inner and outer layers can be formulated to have different properties. For example, the outer layer can be formulated to be relatively more UV resistant than an inner layer. The inner layer can be formulated to be more impact resistant than the outer layer at low temperatures.

DETAILED DESCRIPTION OF THE INVENTION

Figure 1:
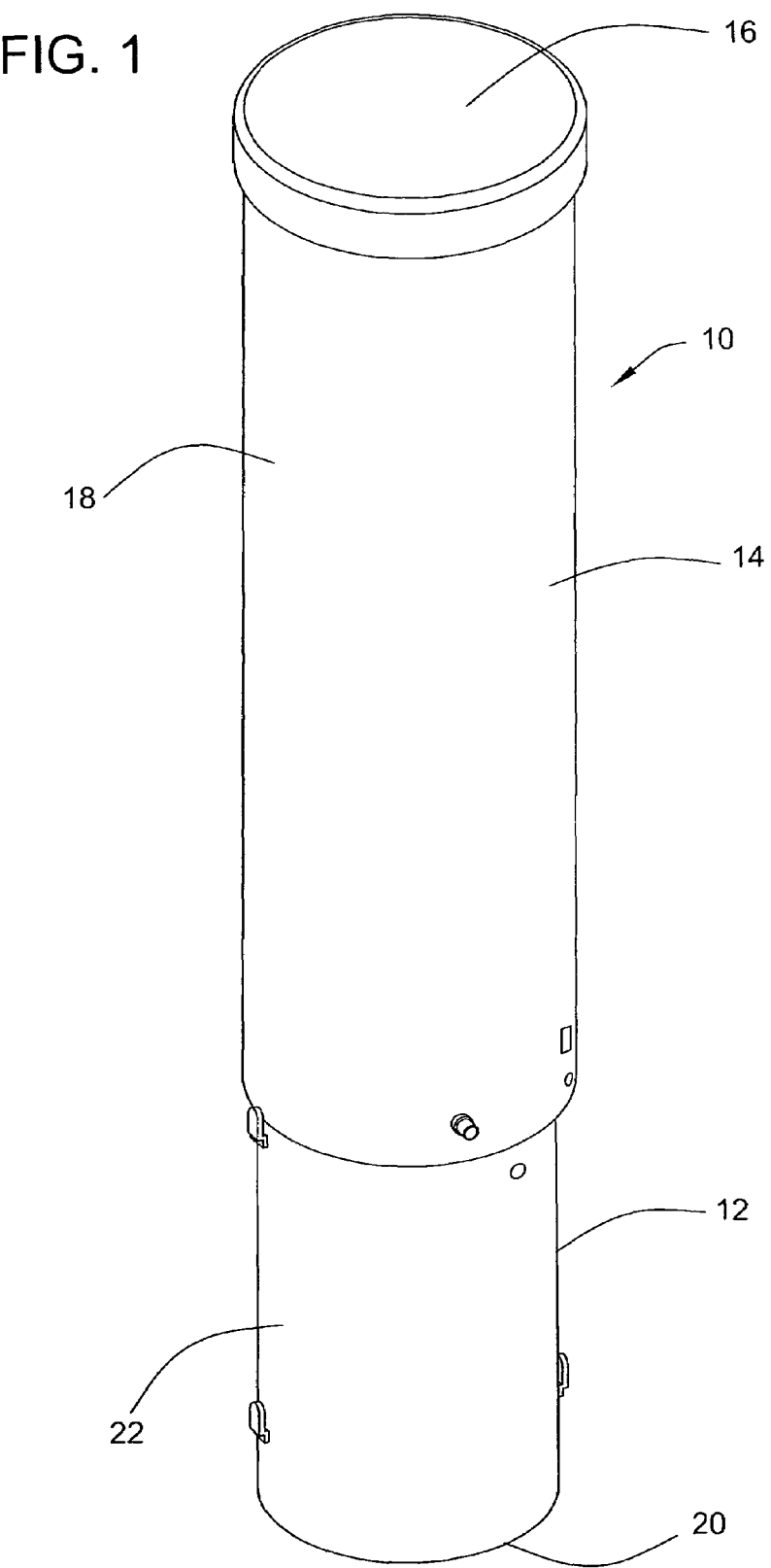
FIG. 1 is a perspective view of an illustrative pedestal enclosure constructed in accordance with the teachings of the present invention.
Figure 2:
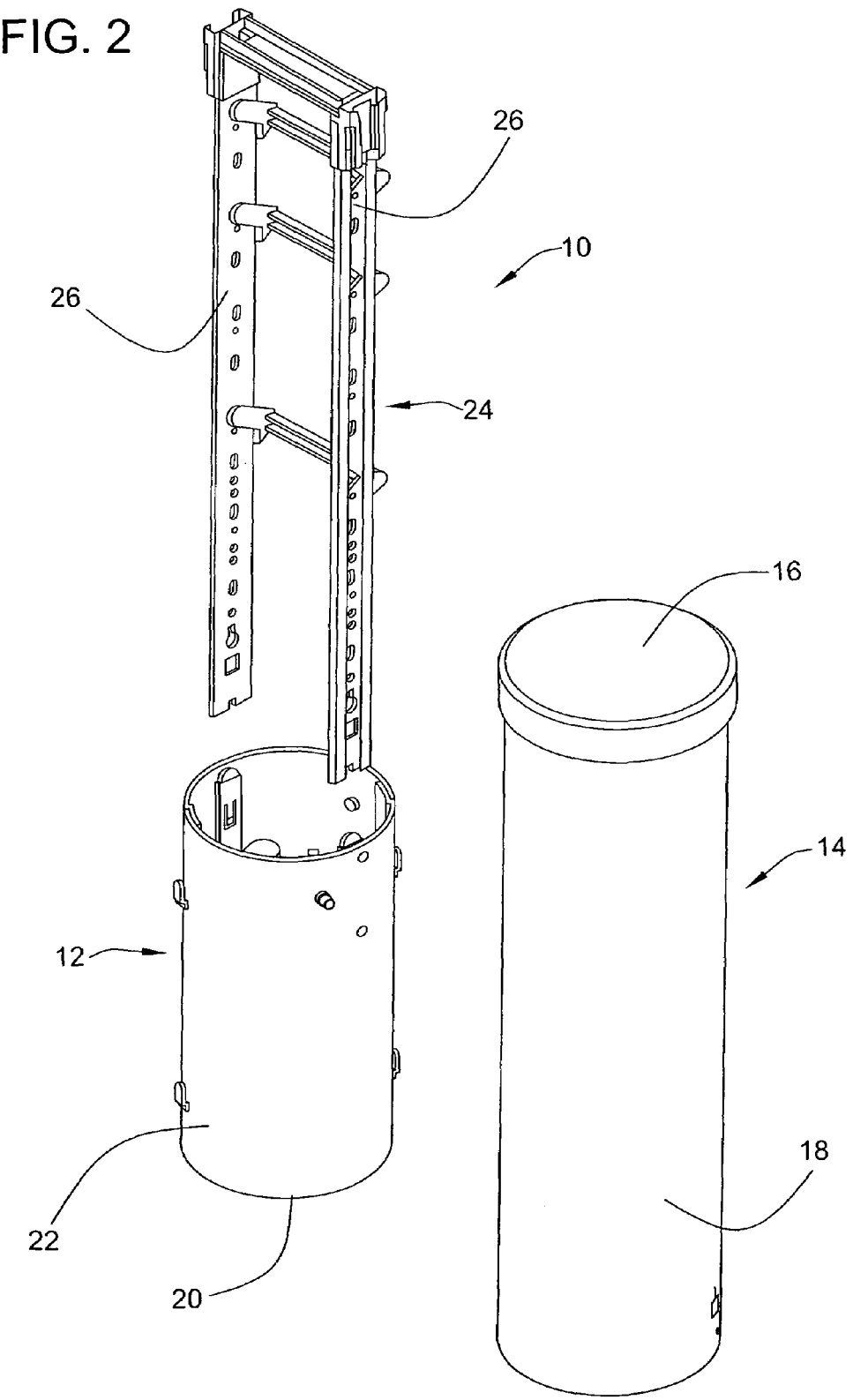
FIG. 2 is an exploded perspective view of the pedestal enclosure of FIG. 1.

Referring now to FIGS. 1 and 2 of the drawings, there is illustrated an exemplary pedestal enclosure 10 constructed in accordance with the teachings of the present invention. The illustrated pedestal enclosure 10 includes a housing comprising, in this case, a base section 12 and a cover or dome 14. The cover 14 nests in a telescoping fashion over the base section 12 so as to define an interior space within the pedestal enclosure 10. This interior space can be used to house electronic equipment such as used in telecommunications, cable television or power transmission applications. The illustrated pedestal enclosure 10 is cylindrical in shape with both the cover 14 and the base section 12 including a respective end wall 16, 20 and a respective sidewall 18, 22. The cover 14 and base section 12 can be secured together by a lock mechanism. As will be appreciated by those skilled in the art, the present invention is not limited to any particular pedestal enclosure size or configuration. Moreover, while the present invention is discussed in the context of telecommunication systems, the present invention is not limited to a pedestal enclosure for housing any particular type of electronic component.

When in use, at least a portion of the base section 12 is typically filled with dirt and/or gravel and buried in the ground. Underground cables can be fed into the interior space of the pedestal enclosure 10 through an opening in the base section 12. To support the cabling, connections or other electronics housed in the pedestal enclosure 10, a bracket system 26 is provided. The bracket system 26 illustrated in FIG. 2 includes a plurality of splice bars 27 extending between a pair of side rails 30.

In order to provide enhanced cost-effectiveness as well as the strength, toughness and weatherability necessary to meet even the stringent standards imposed by the telecommunications industry, the base section and cover can be made of a multilayered plastic material. The multilayered construction can be made using any suitable method including, for example, co-extrusion and co-injection molding. In existing pedestal enclosures, the base section and cover are conventionally made of a single homogenous layer of plastic material. Unfortunately, because it must be specifically formulated to meet so many disparate performance criteria, the plastic used to make telecommunications pedestal enclosures is quite expensive. The use of a multi-layered construction according to the present invention allows the individual layers to have distinct formulations that are designed to have different material properties in order to meet certain specific performance objectives. As a result, the material can be more easily and closely tailored to the requirements of the particular application, e.g., telecommunications. Moreover, it has been found that a multi-layered base section and cover according to the invention that meets the performance requirements of the telecommunications industry can be manufactured much more cheaply than a single layered material that is formulated to conform to the same requirements.

When utilizing a co-extrusion process, the multilayered housing material of the present invention can be produced by feeding the individual plastic formulations, in either powder or pellet form, to two or more different extruders. The multiple plastic layers are extruded separately and then brought together while the layers are still in a molten state such that the layers overlie each other. At this point, the molecular chains of the plastic layers are linked together creating a homogenous bond between the layers. The joined plastic layers are then pushed over or through one or more dies that produces the desired shape for the electronics enclosure housing.

Figure 3:
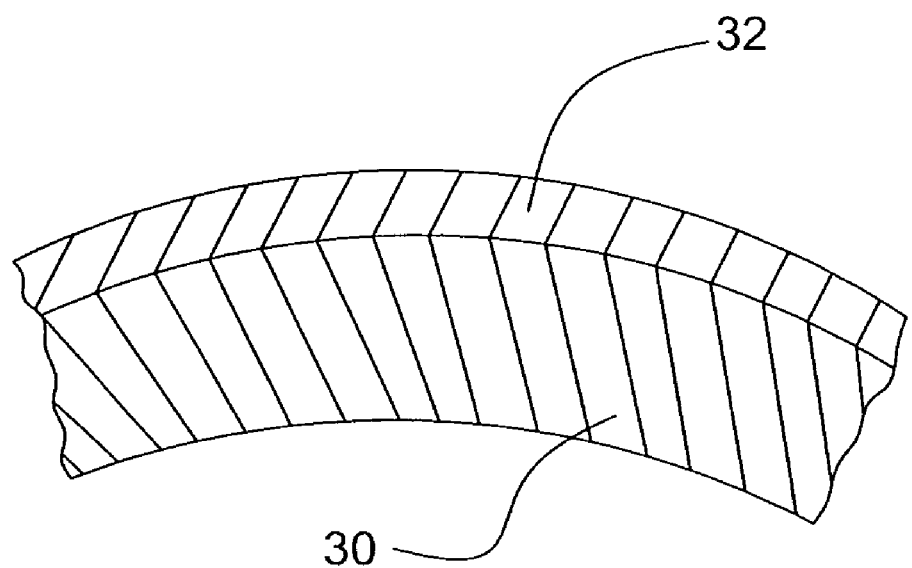
FIG. 3 is an enlarged cross-sectional view of the pedestal enclosure of FIG. 1.

While a material having more layers is possible, in a preferred embodiment, the base section and cover are each made of a material having two layers, i.e. distinct inner and outer layers 30, 32 (see FIG. 3). Preferably, both the inner and outer layers 30, 32 are made of a rigid grade polyvinyl chloride (PVC). However, as described in greater detail below, the PVC compositions used for the two layers have different formulations that are designed to provide each layer with distinct physical properties. In particular, as is well known, the physical properties and processing characteristics of PVC can be adjusted through the use of various plasticizers, fillers, stabilizers, impact modifiers and lubricants. In this case, the outer layer 32, which is directly exposed to the environment including sunlight, can be formulated to have the UV resistance required for outdoor applications. In turn, the inner layer 30 can be formulated to provide less UV resistance. Similarly, the inner layer 30 can be formulated to provide superior mechanical properties such as cold weather impact as compared to the outer layer 32. For a pedestal enclosure such as shown in FIGS. 1 and 2, the outer layer 32 preferably is between approximately 0.030-0.050 inch thick and inner layer 30 preferably is between approximately 0.138-0.158 inch thick.

As will be appreciated, the specific type of PVC resin as well as the specific additives used can vary depending on the design requirements for particular applications. For outdoor telecommunications applications, in particular such applications requiring compliance with the GR-13-CORE standards promulgated by Telcordia Technologies, the base PVC resin used for both the inner and outer layer PVC compositions is preferably a PVC homopolymer made by a suspension polymerization process. More specifically, a suspension grade PVC homopolymer with a K value of 67 (as determined by ISO Standard 174) and an intrinsic viscosity of 0.93 (as determined by ASTM D1243) can be used. To enhance conversion of the resin as well as the physical properties of the resultant plastic material, the inner and outer layer PVC compositions can include a processing aid. A preferred processing aid is a high molecular weight methyl methacrylate alkyl acrylate copolymer. The processing aid is preferably provided in relatively small amounts such as around 1 part per hundred of PVC resin (phr).

To provide resistance to the UV radiation encountered in outdoor applications, the composition of each layer can include a UV stabilizing pigment. Over time, exposure to UV radiation can affect a polymer's mechanical strength as well as produce a major color shift. While PVC homopolymers have a natural ability to withstand the effects of UV radiation with only a limited reduction in mechanical properties, PVC homopolymers can have color shift problems. Thus, to help the PVC composition withstand color shift due to prolonged UV exposure, both the inner and outer layers 30, 32 can include a rutile titanium dioxide pigment as a UV stabilizer. The titanium dioxide can have a siloxane surface coating and a mean particle size of about 0.23 micron. Since the inner layer 30 will not be directly exposed to sunlight, it can have significantly less titanium dioxide than the outer layer 32. For example, according to one preferred embodiment, the inner layer 30 can have around 2.5 phr of titanium dioxide while the outer layer 32 can have around 10.0 phr of titanium dioxide. A filler material also can be added to both the inner and outer layer 30, 32 compositions as a package with the UV stabilizing pigment. In a preferred embodiment, the filler material is calcium carbonate with the inner layer 30 having around 7.0 phr and the outer layer 32 having around 3.0 phr. The use of an appropriate heat stabilizer can also provide protection against color shift caused by exposure to UV radiation. In a preferred embodiment, a butyltin mercaptoacetate heat stabilizer can be used in both the inner and outer layer compositions at level of around 1.8 phr.

To improve the impact resistance of the rigid PVC resin, the compositions of both the inner and outer layers can include an appropriate impact modifier that has a low glass transition temperature. In this case, an acrylic impact modifier is used in the composition for the outer layer 32. Specifically, in a preferred embodiment, a polybutyl acrylate—polymethyl methacrylate copolymer at a level of around 8.0 phr can be used as an impact modifier in the composition for the outer layer 32. For the inner layer 30, preferably, a methacrylate butadiene styrene (MBS) impact modifier at a level of around 6.0 phr can be used. Because the inner layer 30 uses a MBS impact modifier as well as less titanium dioxide pigment, the inner layer 30 has certain superior mechanical properties as compared to the outer layer 32. For example, the MBS impact modifier provides better impact resistance at low temperatures than the acrylic impact modifier. Conversely, the acrylic impact modifier provides better weatherability than the MBS impact modifier. Thus, the use of a co-extruded material for the housing allows the inner layer 30 to be specifically formulated with a MBS impact modifier to provide cold weather impact resistance without regard to the weatherability limitations of MBS since the inner layer is not exposed to the elements. Similarly, with the co-extrusion of the present invention, the outer layer 32 can use an acrylic impact modifier to provide superior weatherability without regard to the low temperature impact resistance since the inner layer provides that housing property.

Once the base plastic formulations for the two layers have been established, the formulations may need to be adjusted due to issues associated with the manufacturing process. For example, a co-extrusion process is a relatively longer process than a basic single layer extrusion. As a result, when using a co-extrusion process, the formulations of the inner and outer layers may need to be adjusted to prevent the longer residence time from causing any substantial degradation in the mechanical chains of the plastic layers. In addition, the fusion time for the two layers should be substantially identical. The formulation of both layers also should take into account the thermal stability requirements associated with the processing temperatures and the frictional heat generated when the layers move across and through the dies. One way in which some of these adjustments can be made is through the use of a lubricant package. Such a lubricant package can include additives that act as external lubricants and additives that function both as an internal and an external lubricant. According to a preferred embodiment of the invention, the lubricant packages for both the inner and outer layers 30, 32 can include calcium stearate, an ester lubricant such as glycerol monostearate and a PE wax such as oxidized low molecular weight polyethylene. The lubricant package for the inner layer 30 preferably also can include a paraffin wax such as hydrocarbon wax. The lubricants are typically provided in relatively small amounts. For example, in a preferred embodiment, the total lubricant package is around 2.7 phr for the outer layer 32 (e.g., approximately 1.2 phr calcium stearate, 1.0 phr ester lubricant and 0.5 phr PE wax) and around 3.25 phr for the inner layer 30 (e.g., approximately 0.9 phr calcium stearate, 0.75 phr ester lubricant, 0.2 phr PE wax and 1.5 phr paraffin wax). The heat stabilizer also helps improve the thermal stability of the resin allowing the inner and outer layer compositions to withstand longer residence times without degradation.

While exemplary PVC compositions have been described for GR-13-CORE compliant outdoor telecommunications pedestal enclosures, it will be understood that the present invention is not limited to these exemplary formulations. To the contrary, the invention could encompass multilayered housings for outdoor electronics enclosures for other types of equipment such as power transmission or cable television equipment. Also, the composition of the different layers can be varied such as by using different additives, different base materials or different amounts of the additives.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An outdoor pedestal enclosure for housing telecommunications equipment comprising:
   a base section having an open top; and
   a cover engageable over the open top of the base section so as to define an interior space;
   wherein the base section and cover each have a multilayered construction, the multilayered construction comprising a plurality of layers with contiguous pairs of layers of the plurality of layers being fused together such that the contiguous layers are linked together at a molecular level producing a continuous, homogenous bond between the contiguous layers, the plurality of layers being formed simultaneously during a single manufacturing operation, the plurality of layers including, at least, an outer layer and an inner layer, the outer layer defining a respective outer surface of the base section or cover and comprising an outer layer plastic material, the inner layer being arranged inward of the outer layer relative to the interior space and comprising an inner layer plastic material, the inner layer plastic material and the outer layer plastic material having different formulations.

2. The outdoor pedestal enclosure of claim 1 wherein the outer layer plastic material is formulated to be relatively more UV resistant than the inner layer plastic material.

3. The outdoor pedestal enclosure of claim 1 wherein the inner layer plastic material is formulated to be relatively more impact resistant than the outer layer plastic material at cold temperatures.

4. The outdoor pedestal enclosure of claim 1 wherein the inner layer plastic material and the outer layer plastic material include PVC resin.

5. The outdoor pedestal enclosure of claim 4 wherein the inner layer plastic material and the outer layer plastic material include titanium dioxide with the outer layer plastic material having relatively more titanium dioxide.

6. The outdoor pedestal enclosure of claim 4 wherein the outer layer plastic material includes an acrylic impact modifier.

7. The outdoor pedestal enclosure of claim 6 wherein the inner layer plastic material includes a MBS impact modifier.

8. The outdoor pedestal enclosure of claim 6 wherein the acrylic impact modifier comprises a polybutyl acrylate polymethyl methacrylate copolymer.

9. The outdoor pedestal enclosure of claim 1 wherein the inner layer is relatively thicker than the outer layer.

* * * * *